United States Patent
Ellis et al.

(10) Patent No.: US 6,552,334 B2
(45) Date of Patent: Apr. 22, 2003

(54) WELLBORE CALIPER MEASUREMENT METHOD USING MEASUREMENTS FROM A GAMMA-GAMMA DENSITY

(75) Inventors: Darwin V. Ellis, Ridgefield, CT (US); Mohammed Doghmi, Metairie, LA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 58 days.

(21) Appl. No.: 09/847,501

(22) Filed: May 2, 2001

(65) Prior Publication Data

US 2002/0165670 A1 Nov. 7, 2002

(51) Int. Cl.[7] ............................. G01V 5/12; E21B 47/08
(52) U.S. Cl. .................... 250/269.3; 250/266; 250/256; 73/152.14
(58) Field of Search ................................ 250/256, 269.3, 250/265, 266; 73/152.14, 152.01, 152.54, 152.57, 152.03, 152.05

(56) References Cited

U.S. PATENT DOCUMENTS

| | | | |
|---|---|---|---|
| 3,321,625 A | | 5/1967 | Wahl |
| 4,479,564 A | | 10/1984 | Tanguy |
| 4,558,220 A | * | 12/1985 | Evans ........................ 250/266 |
| 4,637,479 A | | 1/1987 | Leising |
| 4,864,129 A | * | 9/1989 | Paske et al. ............. 250/252.1 |
| 4,879,463 A | | 11/1989 | Wraight et al. |
| 4,894,534 A | * | 1/1990 | Paske et al. ................ 250/254 |
| 5,017,778 A | | 5/1991 | Wraight |
| 5,130,950 A | | 7/1992 | Orban et al. |
| 5,204,529 A | * | 4/1993 | Diatschenko ............... 250/266 |
| 5,473,158 A | | 12/1995 | Holenka et al. |
| 5,486,695 A | * | 1/1996 | Schultz et al. .............. 250/254 |
| 5,513,528 A | | 5/1996 | Holenka et al. |
| 5,530,243 A | | 6/1996 | Mathis |
| 6,285,026 B1 | * | 9/2001 | Evans et al. ................ 250/265 |

FOREIGN PATENT DOCUMENTS

| | | | |
|---|---|---|---|
| EP | 0663511 A2 | 7/1995 | |
| EP | 663511 A2 | * 7/1995 | ........... E21B/47/08 |
| GB | 2136562 | 9/1984 | |
| GB | 2349947 | 11/2000 | |

OTHER PUBLICATIONS

Search Report Under Section 17 for Great Britain Patent Application No. GB 0208767.4 dated Nov. 5, 2002.

* cited by examiner

Primary Examiner—Constantine Hannaher
Assistant Examiner—Albert Gagliardi
(74) Attorney, Agent, or Firm—Victor H. Segura; Brigitte L. Jeffrey

(57) ABSTRACT

Methods are disclosed for determining the standoff of a well logging instrument from the wall of a wellbore and the shape of the wellbore itself. The methods include measuring a compensated gamma-gamma formation density at a rotary orientation proximate a bottom of the wellbore, and measuring an apparent density at at least one other rotary orientation. The apparent density is related to the compensated density, a density of a fluid disposed between the logging instrument and a wall of the wellbore, and the standoff. Repeated measurements at a plurality of axial positions along the wellbore provide a log of the wellbore.

20 Claims, 4 Drawing Sheets

WELLBORE CALIPER MEASUREMENT METHOD USING MEASUREMENTS FROM A GAMMA-GAMMA DENSITY

BACKGROUND OF THE INVENTION

1. Field of the Invention

The invention relates generally to the field of instruments used to measure the diameter of a wellbore drilled through earth formations. More specifically, the invention relates to methods for calculating a wellbore diameter using measurements made by a gamma-gamma density logging instrument.

2. Description of Related Art

Wellbores are drilled through earth formations for, among other purposes, extracting oil, gas, and water. Wellbores are typically drilled using a rotary drill bit turned by a drilling rig, hydraulically operated motor ("mud motor") or similar devices known in the art. After a wellbore is drilled through the intended earth formations, a protective pipe or casing is typically cemented into the wellbore to maintain the mechanical integrity of the wellbore and to hydraulically isolate the penetrated earth formations from each other. When cementing the casing in place, it is useful to have knowledge of the shape of the wellbore, particularly its diameter along its length, so that the volume of cement needed to fill an annular space between the wellbore wall and the casing can be accurately determined. Various types of caliper devices are known in the art for determining the diameter of the wellbore, such as contact arm devices, and acoustic calipers. A typical contact arm device which can measure the diameter of the wellbore along its length is described in U.S. Pat. No. 3,321,625 issued to Wahl.

More recently it has become common to measure petrophysical properties of the earth formations penetrated by wellbores, called "logging" the wellbore, while the drilling of the wellbore is in progress. See, for example, U.S. Pat. No. 5,513,528 issued to Holenka et al. which describes a method and apparatus for making petrophysical measurements during the drilling process. Such "logging while drilling" (LWD) instruments and methods include those which can make measurements corresponding to the bulk density of the earth formations penetrated by the wellbore. One such instrument is described, for example, in U.S. Pat. No. 5,473,158 issued to Holenka et al. One practical limitation of LWD instruments and methods is that using contact arm-type caliper devices to measure wellbore diameter, such as the one disclosed in the Wahl '625 patent, is extremely difficult and expensive. Consequently, the typical caliper device known in the art is generally an acoustic travel time measurement device, such as disclosed in the Holenka et al '528 patent referred to earlier. One practical limitation to acoustic travel time measurement devices used in wellbore diameter measurement is that it is necessary to know the acoustic velocity of a liquid ("drilling mud") filling the wellbore in order to be able to convert acoustic travel time into accurate determinations of distance of the acoustic sensor to the wellbore wall. As is known in the art, a number of factors affect the acoustic velocity of drilling mud, including ambient temperature and pressure. These factors may not be constant along the length of the wellbore. In addition, the acoustic sensor adds cost and complexity to the LWD instrument assembly.

It is desirable to have a method and apparatus for measuring wellbore diameter which does not rely on acoustic travel time through wellbore fluid.

SUMMARY OF THE INVENTION

One aspect of the invention is a method for determining the standoff of a well logging instrument from the wall of a wellbore. The method according to this aspect of the invention includes measuring a compensated gamma-gamma formation density at a rotary orientation proximate a bottom of the wellbore, and measuring an apparent density at one other rotary orientation. The apparent density is related to the compensated density, a density of a fluid disposed between the logging instrument and a wall of the wellbore, and the standoff.

Another aspect of the invention is a method for determining a shape of a wellbore. A method according to this aspect of the invention includes measuring a compensated gamma-gamma formation density at a rotary orientation proximate a bottom of the wellbore. An apparent density is then measured at one other rotary orientation about the wellbore. The apparent density is related to the compensated density, a density of a fluid disposed between the logging instrument and a wall of the wellbore, and the standoff. The standoff is then combined with a diameter of a well logging instrument used to make the gamma-gamma density measurements to determine the shape of the wellbore.

Other aspects and advantages of the invention will be apparent from the following description and the appended claims.

DETAILED DESCRIPTION

Figure 1:
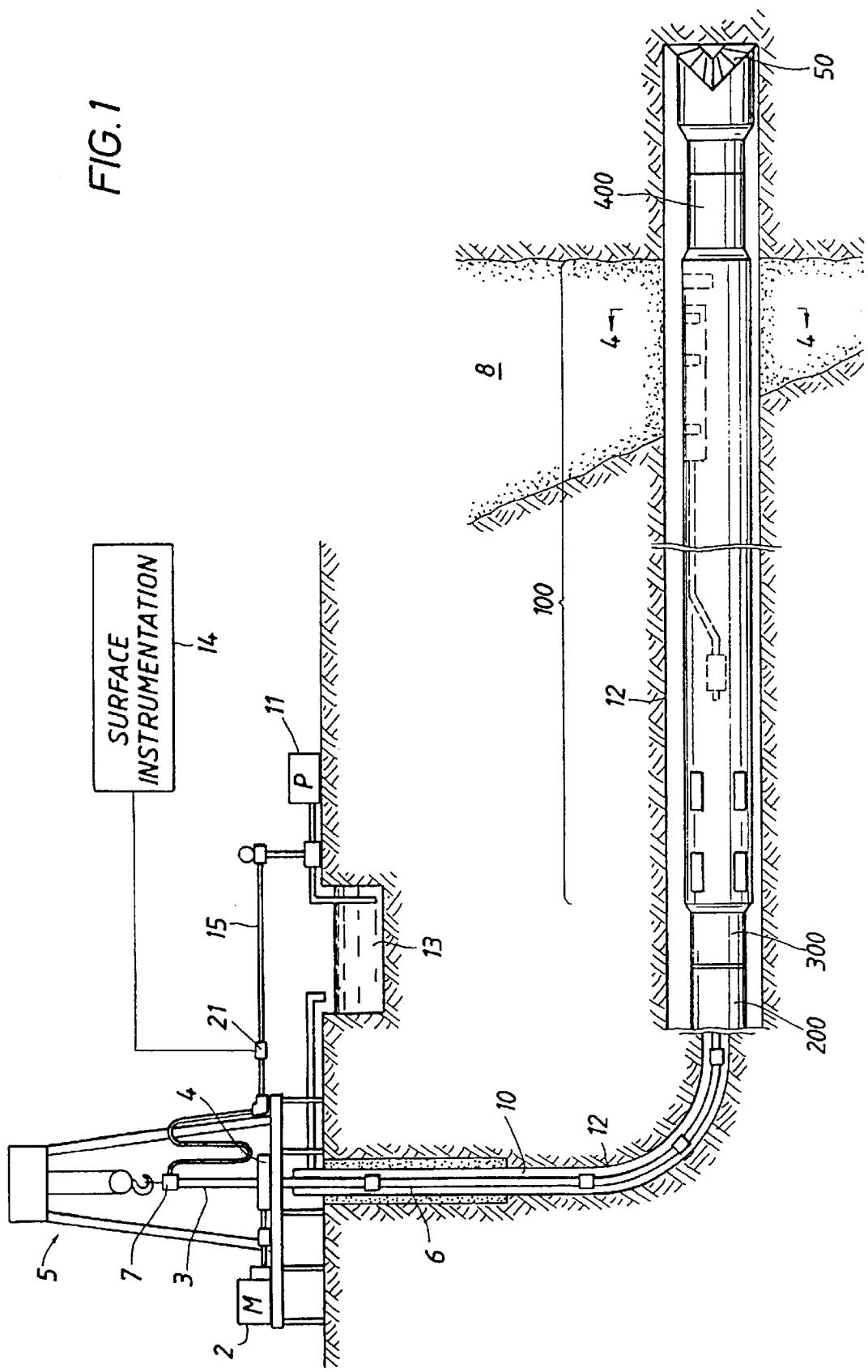
FIG. 1 shows a drilling rig, drill string and an example of an MWD/LWD instrument which may be used with the invention.

Generally speaking, a method according to the invention uses measurements of formation density made using one or another type of "compensated" gamma-gamma well logging instrument. One such instrument is described in U.S. Pat. No. 3,321,625 issued to Wahl. Various improvements and modifications have been made over the years to the instrument described in the Wahl '625 patent, but the general principle is applicable to a method according to the invention. In the most fundamental terms, the principle of the instrument disclosed in the Wahl '625 patent includes irradiating the formation adjacent the instrument with gamma rays having an energy selected to undergo Compton scattering in the earth formations. The Compton scattered gamma rays are detected at at least two detectors having different spacings along the instrument from the gamma ray source. Gamma ray counting rates at the two detectors are converted through an empirically derived transform into values of formation density and a correction factor for the formation adjacent the instrument. The correction factor is intended to provide adjustment for any materials interposed between the source and detectors other than the earth formation. As explained in the Wahl '625 patent, these materials may include filter cake which settles out of the drilling mud and drilling mud in the event the wellbore is not perfectly round and smooth. Typically, most of the instrument response related to the density of the formation, as opposed to the filter cake and drilling mud, is derived from the counting rate of the longer spaced one of the at least two detectors.

Another type of density logging instrument is disclosed in U.S. Pat. No. 5,530,243 issued to Mathis. The instrument disclosed in the Mathis '243 patent includes a plurality of gamma ray detectors, the signals from which are combined in a particular manner to provide a measurement of formation density, as well as an indication of misalignment ("tool tilt") and amount of separation between the instrument ("standoff") and the wall of the wellbore. As is the case for the instrument shown in the Wahl '625 patent, the instrument shown in the Mathis '243 patent typically provides measurement of formation density primarily dependent on the counting rates from the longer, or longest axial spacing detector. Axial spacing refers to the separation along the instrument of the particular detector from the gamma ray source. Irrespective of the type of instrument used, or the principle by which "compensated" or "corrected" formation density measurements are obtained in any embodiment of a method according to the invention, one element of such methods includes making a compensated measurement of formation density when the logging instrument is oriented so that the detector "pad" or "skid" is determined to be in optimal contact with the wall of the wellbore.

Irrespective of the general configuration of density logging instrument, it is known in the art to provide various types of density logging instruments in a drill collar or similar structure to enable LWD operation. One such instrument is disclosed in U.S. Pat. No. 5,473,158 issued to Holenka et al. It is to be clearly understood that the instrument disclosed in the Holenka et al. '158 patent is only an example of a well logging instrument which can make measurements usable in a method according to the invention. Accordingly, the description of the instrument shown herein is not meant to limit the scope of the invention.

FIG. 1 illustrates a logging while drilling (LWD) instrument 100 connected in tandem with a drilling assembly including drill bit 50. An associated downhole electronics module 300 and MWD instrument 200 including magnetometers and accelerometers are also connected in tandem with LWD instrument 100. The electronics module 300 may be a separate "sub" or it may be disposed within the body of LWD instrument 100. A communication sub 400 is also provided, as illustrated, within the drilling assembly.

The LWD instrument 100 is shown for illustration purposes as being in an inclined portion of a borehole at the end of a drill string 6 which turns in a borehole 12 which is formed in earth formation 8 by penetration of the drill bit 50. A drilling rig 5 turns the drill string 6, or the bit 50 may be turned by an hydraulically powered motor ("mud motor"—not shown in the Figures). The drilling rig 5 includes a motor 2 which turns a kelly 3 by means of a rotary table 4 or, alternatively, a topdrive or similar rotary powering system known in the art. The drill string 6 includes sections of drill pipe connected end-to-end to the kelly/topdrive 3 and turned thereby. The MWD instrument 200, the electronics module 300 and the LWD instrument 100, and the communication sub 400 are all connected in tandem with the drill string 6. Such subs and instruments form a bottom hole assembly (BHA) between the drill string 6 which includes drill pipe, and the drill bit 50.

As the drill string 6 and the BHA turn, the drill bit 50 forms the borehole 12 by cutting through the earth formations 8. Drilling fluid or "mud" is forced by a pump 11 from a mud pit 13, via stand pipe 15 and revolving injector head 7 through the hollow center of the kelly/topdrive 3 and the drill string 6, and thence through the BHA to the bit 50. The mud acts to lubricate the drill bit 50 and to carry borehole cuttings upwardly to the surface via an annular space 10 between the drill string and the wall of the wellbore 12. The mud is returned to the mud pit 13 where it is separated from borehole cuttings and the like, degassed, and returned for application again to the drill string 6.

The communication sub 400 receives signals from various sensors in the LWD instrument 100 and from computers in the downhole electronics module 300 and MWD instrument 200. The communications sub 400 is designed to transmit coded acoustic signals representative of signals to the surface through the mud path in the drill string 6 and the BHA. The coded acoustic signals are detected by a transducer 21 in the standpipe 15, where such acoustic signals are detected in surface instrumentation 14. The communication sub 400, including the surface instrumentation necessary to communicate with it, may be arranged as the downhole and surface apparatus disclosed in U.S. Pat. No. 4,479,564 and U.S. Pat. No. 4,637,479, for example. The communication sub 400 may advantageously include the communication apparatus such as disclosed in U.S. Pat. No. 5,237,540.

Figure 2:
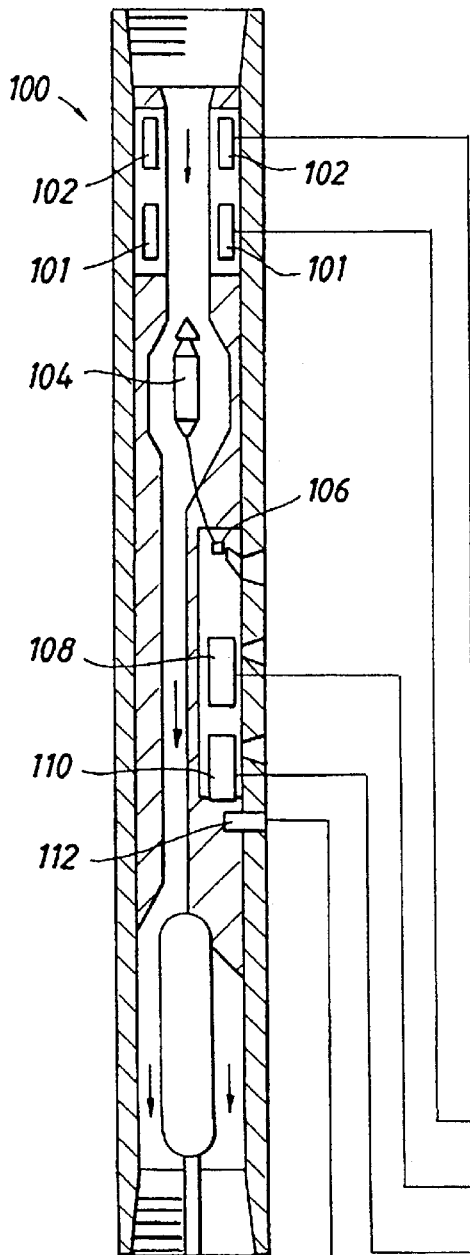
FIG. 2 shows a cross section of the LWD instrument portion of the assembly shown in FIG. 1.

FIG. 2 illustrates in a schematic way the LWD instrument 100. The physical structure of the LWD instrument body and associated sensors is substantially like that described in U.S. Pat. No. 4,879,463 issued to Wraight, et al., and U.S. Pat. No. 5,017,778 issued to Wraight. Both of these patents are assigned to the present assignee. Such patents are mentioned for the description herein of a logging while drilling tool, specifically a compensated density/neutron tool used in logging while drilling measurements of formation characteristics.

The LWD instrument 100 includes a neutron source 104 disposed axially, and near and far spaced neutron detectors 101, 102. The instrument 100 also includes a gamma ray source 106 and short and long spaced gamma ray detectors 108, 110. The LWD instrument 100 may also include an ultrasonic transducer 112 for measuring instrument standoff from the wall of the wellbore 12. Such ultrasonic transducer and a system therefor is described in U.S. Pat. No. 5,130,950 issued to Orban, et al., also assigned to the present assignee.

Figure 3A:
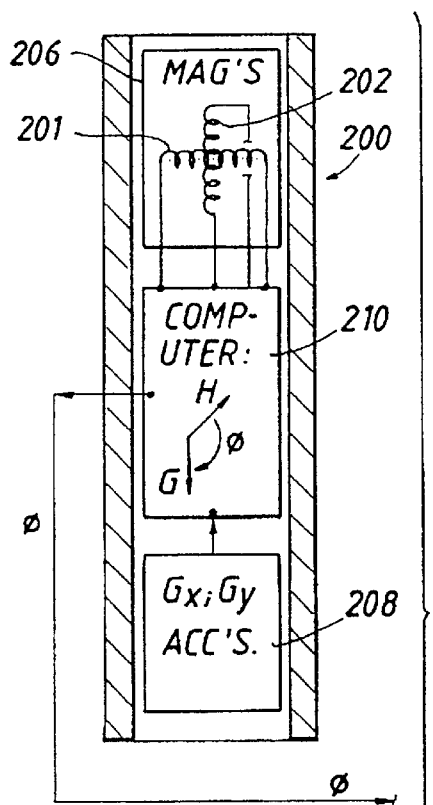
FIG. 3A shows accelerometers and magnetometers which may be included in various embodiments of LWD instrument such as shown in FIG. 2.
Figure 3A:
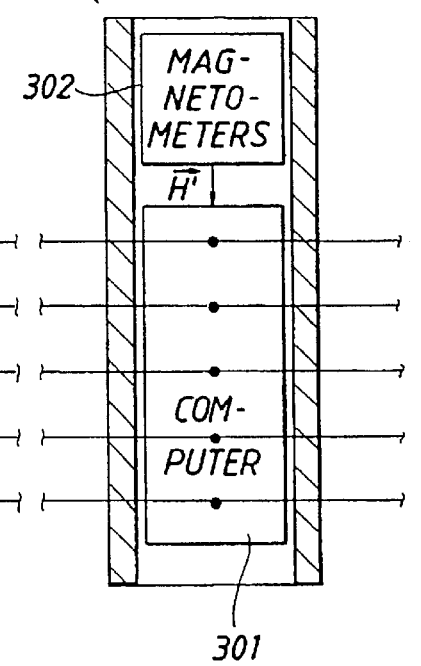
Figure 3B:
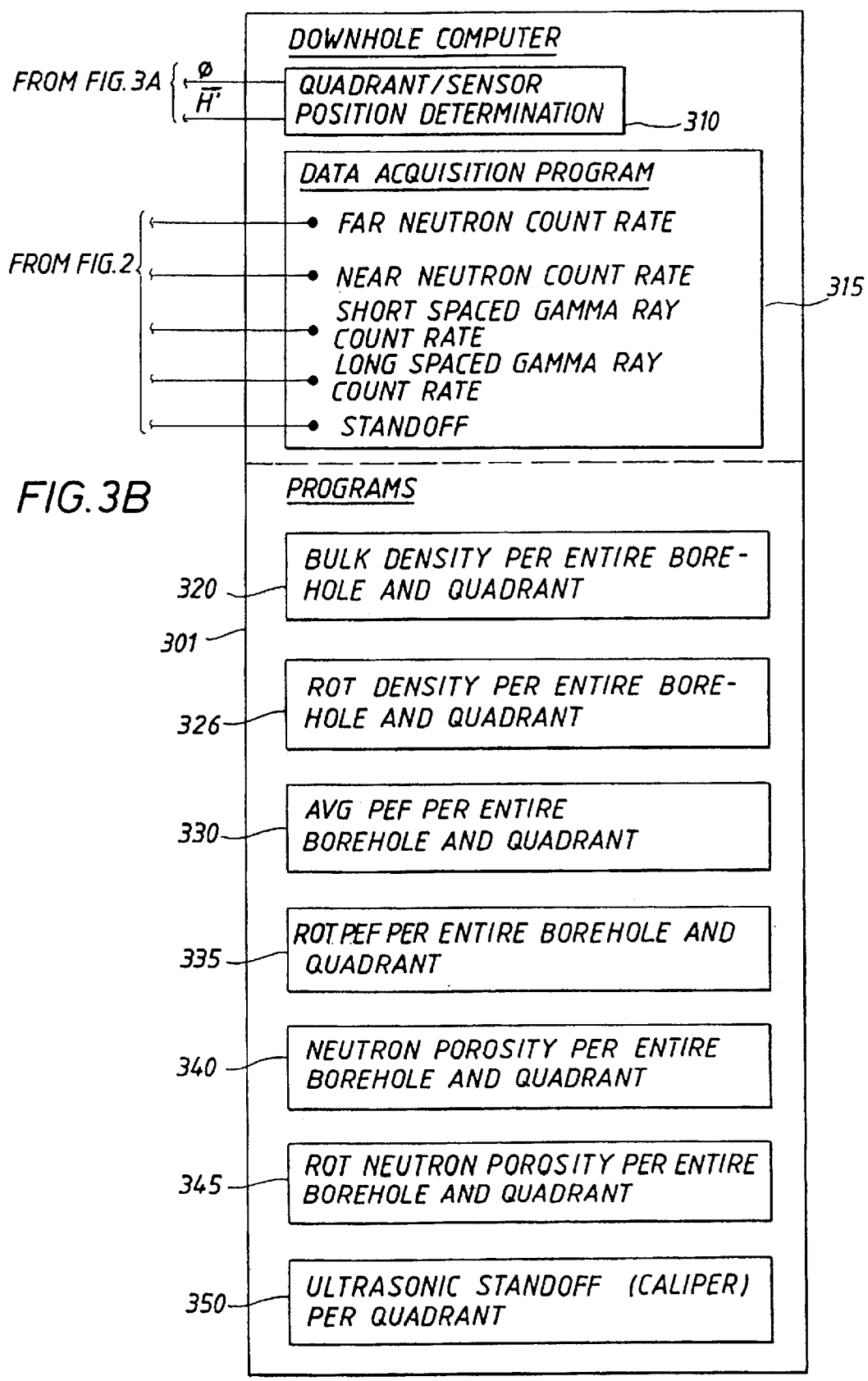
FIG. 3B shows an example of a downhole computer in an instrument such as shown in FIG. 1, and various types of programs which may run on such as computer.

The MWD instrument 200 is provided in the bottom hole drilling assembly as schematically indicated in FIG. 1. FIG. 3A schematically illustrates that MWD instrument 200 includes magnetometers 201, 202 oriented along x and y axes (axes perpendicular to the longitudinal axis) of the instrument 200. The x and y axes, therefore, are in the plane of a radial cross section of the instrument 200. The z axis of the tool is oriented along its longitudinal axis. In a similar way, accelerometers $G_x$ and $G_y$ of an accelerometer package 208 (which also includes an accelerometer along the z axis of the tool) are oriented along the x and y axes of the tool. A microcomputer 210 responds to axial components of the earth's magnetic field as measured by the axial magnetometers $H_y$ and $H_x$ and to axial components of the earth's gravity measured by accelerometers $G_x$ and $G_y$ to periodically determine an angle, $\phi$, subtended between magnetic field vector H and gravity vector G, in the cross sectional plane of MWD instrument 200. The H vector represents that portion of a vector pointed to earth's magnetic north pole which is projected onto the x-y plane of the MWD instrument 200. The G vector represents the component in the cross sectional plane of MWD instrument 200, of the earth's gravity vector. As illustrated in FIG. 3B, a signal representative of such angle φ is periodically communicated to downhole computer 301 in the electronics module 300.

The electronics module 300 receives data from near and far spaced neutron detectors 101 and 102, short and long spaced gamma ray detectors 108, 110 and ultrasonic transducer 112. Ultrasonic transducer 112 in this embodiment is angularly aligned with gamma ray detectors 108, 110 and with gamma ray source 106.

As illustrated in FIG. 3B, the downhole computer 301 may include a Quadrant/Sensor Position Determination program 310, a data acquisition program 315, a bulk density calculation program 320, a rotational density per entire borehole and per quadrant program 326, an average photoelectric effect (PEF) program 330, a rotational PEF program 335, a neutron porosity program 340, a rotational neutron porosity program 345, and an ultrasonic standoff program 350, and others. A program which calculates standoff according to the method of the present invention may also be included on the downhole computer 301. The nature of the standoff determination according to the present invention will be further explained.

Figure 4:
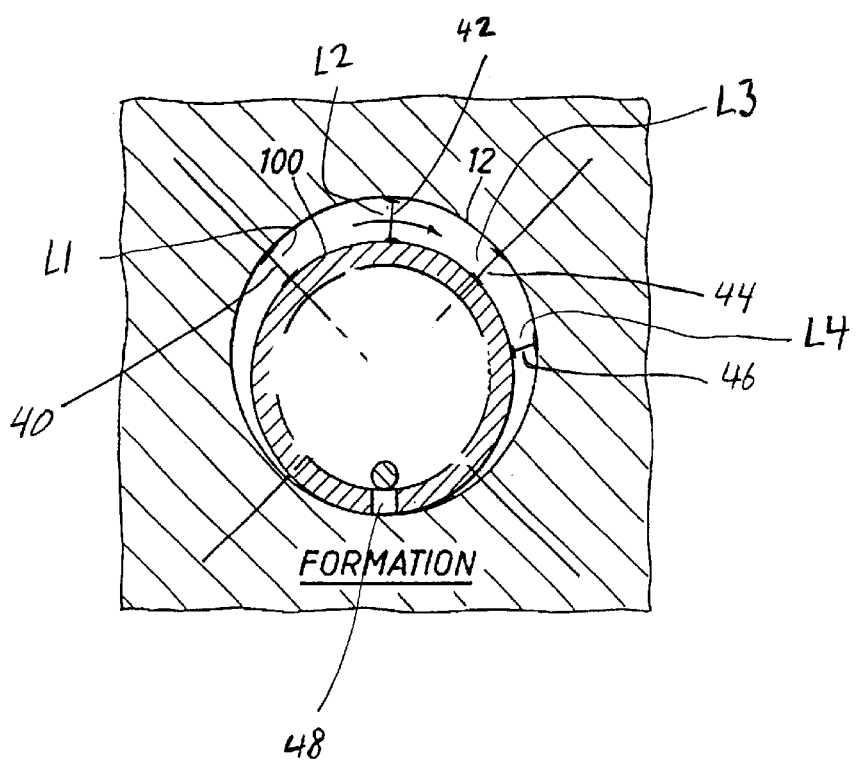
FIG. 4 shows a cross section through the instrument shown in FIG. 1, at a position of the source and detectors, to illustrate a method according to the invention.

In a method according to one embodiment of the invention, as shown in a cross section through the instrument disposed the wellbore in FIG. 4, the instrument 100 may be oriented so that the source and detectors are substantially at the bottom (or low or downward side in wellbores having inclination other than horizontal), shown at 48, of the wellbore 12. In such orientation, the instrument 100 is most likely to make a measurement that most closely corresponds to the density of the formation surrounding the wellbore 12. Preferably, the density measurement made with the instrument 100 in this orientation is made using one of the "compensated" or "corrected" density measurement techniques known in the art such as described in the Wahl '625 patent or the Mathis '243 patent referred to earlier. A suitable method for determining when the source and detectors are oriented toward the bottom 48 is described, for example, in U.S. Pat. No. 5,473,158 issued to Holenka et al. Other methods for determining the rotary orientation of the instrument 100 are known in the art. In the event the bottom or low side of the wellbore 12 includes irregularities in the wall thereof, such as "keyseats", or "washouts" or the like, a corrected, or compensated density measurement may be made at another rotary orientation of the instrument 100, preferably proximate the bottom 48 to ensure that the source and detectors are proximate the formation and are therefore arranged to make a suitably accurate corrected measurement of the formation density.

Having determined a corrected, or compensated, formation density at a rotary orientation proximate the bottom 48, the instrument 100 may then be rotated through a selected amount of angular displacement, and another measurement of counting rates at the most axially spaced apart detector (or one of the detectors used to make the primary density measurement) may be made at a different rotary orientation, for example as shown at 40, 42, 44 and 46. Because the instrument 100 tends to rest on the bottom or low side 48, a standoff or separation will typically exist, as shown at L1, L2, L3, L4, at the various rotary orientations 40, 42, 44 and 46, respectively. A response of the detectors will be related to the amount, or distance, of the standoff, L1, L2, L3, L4, to the density of the material filling the standoff space (the drilling mud) and to the density of the formation. In a method according to the invention, a formation density is determined using one of the previously explained corrected or compensated methods when the instrument 100 is oriented so that the source and detectors are oriented downward or nearly downward. This value of density at each axial position of the instrument 100 along the wellbore 12 (or at selected axial positions of the instrument 100 along the wellbore 12) is then used for the measurements of density made at the other rotary orientations 40, 42, 44, 46, to determine an apparent value of standoff distance. Expressed mathematically:

$$t_{so} = k(p_f - p_m)/(p_f - p_{df}) \quad (1)$$

where $t_{so}$ represents the standoff distance, k represents a proportionality constant which may be empirically determined, $p_m$ represents the measured or "apparent" density at each of the "off bottom" rotary orientations 40, 42, 44, 46, $p_f$ represents the apparent formation density determined with the sensors and source oriented at or near bottom 48, and $p_{df}$ represents the density of the drilling fluid disposed in the wellbore (which ultimately fills the standoffs 40, 42, 44, 46). As is known in the art, the density of the drilling fluid may be determined by measurements made at the earth's surface or other suitable techniques. The proportionality constant, k, will depend on factors such as the spacing between the source and the detector used in the particular well logging instrument, and the type and construction of any collimator used for the source. The proportionality constant may be determined empirically, as previously explained, or may be determined by modeling the response of the logging instrument using techniques well known in the art.

In various embodiments of the invention, a plurality of standoff measurements at different rotary orientations may be made at selected axial instrument positions along the wellbore. The individual standoff measurements may be made to correspond to the instrument rotary orientation at the time each one is made. The rotary orientation of the instrument may be determined at any time by methods known in the art, including one descried in the Holenka et al. '158 patent. The standoff measurements may then be combined with the diameter of the instrument to determine an approximate shape of the wall of the wellbore at any or all of the axial positions at which the standoff measurements are made. Methods for determining wellbore shape from standoff measurements made at a plurality of rotary orientations are known in the art. See, for example, U.S. Pat. No. 5,513,528 issued to Holenka et al.

An image of the wellbore diameter may be made using various embodiments of the invention by moving the logging instrument along the wellbore axially, while rotating the logging instrument. Measurements of the standoff, and wellbore diameter corresponding thereto may be made at various rotary orientations of the instrument at each axial position of the instrument. As the instrument is moved along the wellbore axially, the standoff/diameter measurements of the wellbore at various rotary orientations may be repeated. By repeating the standoff/diameter measurements at various rotary orientations at a plurality of axial positions of the instrument along the wellbore, an "image" of the wellbore related to the wellbore diameter may be developed. Methods for generating various images from azimuthally and axially spaced apart wellbore measurements are well known in the art.

It should be noted that the previously described embodiment of a method according to this invention is intended to be used with a well logging instrument having one set of axially aligned detectors and a gamma ray source. The invention is not limited to use with such instruments however. For example, another type of well logging instrument may include a plurality of source/detector arrangements, each of which arrangement is positioned at a unique position about the circumference of the instrument. Such an instrument would make a similar set of measurements, as does the instrument described previously herein, at selected axial positions along the wellbore. Such measurements may be processed according to the method of the invention to derive a standoff measurement corresponding to the rotary position of each one of the source/detector arrangements.

It should also be noted that the disclosed techniques do not depend on whether the source and detectors in any density logging instrument used therefor are disposed in an upset portion, such as a stabilizer or the like, or are disposed in a "slick" portion (smooth exterior surface having substantially constant external diameter) of a drill collar. It is only necessary, to determine the approximate shape of the wellbore, to know the external diameter of the instrument at the position of the source and detectors to be able to determine standoff and wellbore shape.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a standoff of a well logging instrument from a wall of an earth formation wellbore, comprising:
   measuring a compensated formation density at a rotary orientation proximate a bottom of the wellbore;
   measuring an apparent formation density at at least one other rotary orientation about the wellbore;
   measuring a density of a fluid disposed between the logging instrument and a wall of the wellbore; and
   relating the apparent formation density, the compensated formation density, and the density of the fluid to determine the standoff.

2. The method as defined in claim 1 further comprising combining the standoff with a diameter of the well logging instrument to determine a shape of the wellbore at the at least one other rotary orientation.

3. The method as defined in claim 1 wherein the measurements made at the orientation proximate the bottom and the at least one other rotary orientation are made by separate sensors on the logging instrument positioned at the respective rotary orientations.

4. The method as defined in claim 1 wherein the measurements made at the orientation proximate the bottom and at the at least one other rotary orientation are made by positioning the logging instrument so that a sensor thereon is disposed at the orientation proximate the bottom, rotating the instrument about a longitudinal axis thereof so that the sensor is oriented at the at least one other orientation, and making the measurement thereat.

5. The method as defined in claim 1 wherein the orientation proximate the bottom is determined from measurements of orthogonal components of earth's magnetic field and earth's gravity.

6. The method as defined in claim 1 further comprising repeating the measuring the apparent formation density at a plurality of rotary orientations about the wellbore, and determining a standoff at each of the plurality of rotary orientations.

7. The method as defined in claim 1 further comprising repeating the measuring the apparent formation density at a plurality of rotary orientations about the wellbore, determining a standoff at each of the plurality of rotary orientations, and combining the standoff at each of the rotary orientations to determine a wellbore diameter at each of the rotary orientations.

8. The method as defined in claim 7 further comprising repeating the measuring, combining and determining at the plurality of rotary orientations at a plurality of axial positions along the wellbore.

9. The method as defined in claim 8 further comprising generating an image of the wellbore from the measurements made at a plurality of axial positions along the wellbore.

10. A method for determining a shape of a wellbore, comprising:
    measuring a compensated formation density at a rotary orientation proximate a bottom of the wellbore;
    measuring an apparent formation density at at least one other rotary orientation about the wellbore;
    measuring a density of a fluid disposed between the logging instrument and a wall of the wellbore;
    relating the apparent formation density, the compensated formation density, and the density of the fluid to determine the standoff; and
    combining the standoff with a diameter of a well logging instrument used to make the density measurements to determine the shape of the wellbore.

11. The method as defined in claim 10 further comprising moving the instrument along the wellbore and repeating the measuring and combining at a plurality of axial locations along the wellbore.

12. The method as defined in claim 11 further comprising generating an image of the wellbore from the measurements made at a plurality of axial positions along the wellbore.

13. The method as defined in claim 10 wherein the measurements made at the orientation proximate the bottom and the at least one other rotary orientation are made by separate sensors on the logging instrument positioned at the respective rotary orientations.

14. The method as defined in claim 10 wherein the measurements made at the orientation proximate the bottom and the at least one other rotary orientation are made by positioning the logging instrument so that a sensor thereon is disposed at the orientation proximate the bottom, rotating the instrument about a longitudinal axis thereof so that the sensor is oriented at the at least one other orientation, and making the measurement thereat.

15. The method as defined in claim 10 wherein the orientation proximate the bottom is determined from measurements of orthogonal components of earth's magnetic field and earth's gravity.

16. A method for logging a wellbore, comprising:
    inserting a density well logging instrument into a wellbore;
    measuring a compensated formation density at a rotary orientation proximate a bottom of the wellbore;
    measuring an apparent formation density at at least one other rotary orientation about the wellbore;
    measuring a density of a fluid disposed between the logging instrument and a wall of the wellbore;
    relating the apparent formation density, the compensated formation density, and the density or the fluid to determine the standoff;
    combining the standoff with a diameter of a well logging instrument used to make the density measurements to determine the shape of the wellbore;

moving the instrument axially along the wellbore; and repeating the measuring at the at least one rotary orientation, the measuring at the at least one other rotary orientation and the combining at a plurality of axial positions along the wellbore.

17. The method as defined in claim 16 wherein the measurements made at the orientation proximate the bottom and the at least one other rotary orientation are made by separate sensors on the logging instrument positioned at the respective rotary orientations.

18. The method as defined in claim 16 wherein the measurements made at the orientation proximate the bottom and the at least one other rotary orientation are made by positioning the logging instrument so that a sensor thereon is disposed at the orientation proximate the bottom, rotating the instrument about a longitudinal axis thereof so that the sensor is oriented at the at least one other orientation, and making the measurement thereat.

19. The method as defined in claim 16 wherein the orientation proximate the bottom is determined from measurements of orthogonal components of earth's magnetic field and earth's gravity.

20. The method as defined in claim 16 further comprising generating an image of the wellbore from the measurements made at the plurality of axial positions along the wellbore.

* * * * *